United States Patent
Lillebo et al.

(10) Patent No.: US 12,492,132 B2
(45) Date of Patent: Dec. 9, 2025

(54) DEVICE FOR CONTROLLING THERMAL HYDROLYSIS DECOMPRESSION AND PROCESS PLANT COMPRISING SUCH DEVICE

(71) Applicant: Cambi Technology AS, Asker (NO)

(72) Inventors: Andreas Helland Lillebo, Oslo (NO); Alexandru Botan, Reistad (NO); Hans Rasmus Holte, Reistad (NO)

(73) Assignee: Cambi Technology AS, Asker (NO)

( * ) Notice: Subject to any disclaimer, the term of this patent is extended or adjusted under 35 U.S.C. 154(b) by 971 days.

(21) Appl. No.: 17/635,149

(22) PCT Filed: Aug. 14, 2020

(86) PCT No.: PCT/EP2020/072874
§ 371 (c)(1),
(2) Date: Feb. 14, 2022

(87) PCT Pub. No.: WO2021/032623
PCT Pub. Date: Feb. 25, 2021

(65) Prior Publication Data
US 2022/0274850 A1      Sep. 1, 2022

(30) Foreign Application Priority Data
Aug. 16, 2019  (EP) .................................. 19192152

(51) Int. Cl.
*C02F 1/02*   (2023.01)
*C02F 11/18*  (2006.01)

(52) U.S. Cl.
CPC .............. *C02F 1/025* (2013.01); *C02F 11/18* (2013.01); *C02F 2201/005* (2013.01)

(58) Field of Classification Search
None
See application file for complete search history.

(56) References Cited

U.S. PATENT DOCUMENTS 8,673,112 B2 *  3/2014  Nilsen ........................ B01J 3/02
                                                      162/239
9,103,070 B2     8/2015  Hunt et al.
(Continued)

FOREIGN PATENT DOCUMENTS

| CN | 101802165 A | 8/2010 |
|---|---|---|
| CN | 108426069 A | 8/2018 |

*Primary Examiner* — Ali Z Fadhel
(74) *Attorney, Agent, or Firm* — Downs Rachlin Martin PLLC

(57) ABSTRACT

The present invention provides a device for controlling steam explosion of biomass having a dry solids content above 1%, a VS content of above 20%, and including abrasive material, in a pressure relief vessel, which includes one or more blowdown conduits having at their outlets an adjustable open area for regulating the blowdown discharge rate. The adjustable open area of each of the one or more blowdown conduits are constructed in such a way that expansion/spray due to flashing takes place either inside the pressure relief vessel itself or in an additional inlet device through which the discharged biomass is directed from the adjustable open area and into the pressure relief vessel and which either have a large enough dimension to avoid the discharged biomass hitting essential parts of the construction or is made from a highly resistant/durable material.

17 Claims, 8 Drawing Sheets

(56) References Cited

U.S. PATENT DOCUMENTS

| | | | |
|---|---|---|---|
| 2014/0251902 A1* | 9/2014 | Solheim | C02F 11/13 |
| | | | 210/178 |
| 2015/0367308 A1* | 12/2015 | Solheim | C10G 1/00 |
| | | | 530/500 |
| 2017/0203988 A1* | 7/2017 | Gonzalez Calvo | C02F 1/025 |
| 2017/0314046 A1* | 11/2017 | Nilsen | C02F 11/185 |
| 2019/0145529 A1 | 5/2019 | Turnau et al. | |

* cited by examiner

DEVICE FOR CONTROLLING THERMAL HYDROLYSIS DECOMPRESSION AND PROCESS PLANT COMPRISING SUCH DEVICE

FIELD OF THE INVENTION

The present invention concerns a device for controlling steam explosion of biomass in a pressure relief vessel due to large pressure drops over a short time, thereby causing cell destruction and larger bioavailability of the biomass. In particular, the present invention concerns a device for relieving the pressure of biomass, the biomass being in the form of moist material which preferably has been heated and pressurized in a reactor. The device includes one or more blowdown conduits having at their outlets (or at its outlet as the case may be), i.e. at the very tip or end thereof, an adjustable open area for regulating the blowdown discharge rate. The adjustable open area of each of the one or more blowdown conduit should be constructed in such a way that it ensures that the smallest cross sectional/opening area of the blowdown conduit is at the very tip of the blowdown conduit, so that expansion/spray due to flashing will take place either inside the pressure relief vessel itself or in a vessel-inlet-nozzle/device (i.e. an additional inlet device through which the discharged biomass is directed from the adjustable open area and into the pressure relief vessel). Any such vessel-inlet-nozzle/devices should either have a large enough dimension to avoid the discharged biomass hitting essential parts of the construction or be made from a highly resistant/durable material, such as e.g. silicon carbide. The invention relates also to a plant thermal hydrolysis of raw biomass comprising such device.

BACKGROUND OF THE INVENTION

Thermal hydrolysis is a process of treating a wet or moist material at elevated temperature. The heated and pressurized material is then often subject to a rapid decompression. In waste treatment industry both processes are often referred to as a thermal hydrolysis process (THP). The application of THP is not only limited to pre-treatment of organic substrates prior to biological downstream treatment, e.g. anaerobic digestion or fermentation for production of biogas or bio-ethanol, respectively, but can be also used for non-biological downstream processing, for instance, for production of fuel-pellets from lignocellulosic material.

The technology behind THP is described in great details in WO 1996009882 A1 and WO 2011006854 A1. Thus, substrate is first pre-heated from ambient temperature with flash steam resulting from at least one subsequent pressure reduction step. Pre-heated material is then transferred to a reactor where pressure increases up to 2.7-26 bar, e.g. by means of live steam injection as described in WO 1996009882. In certain situation this will correspond to temperatures up to 226° C.

In most cases the temperature in a reactor should be in a certain range as overheating may lead to undesirable changes in chemical composition of the material. The desired effect of THP is also not achieved at low temperatures. Typically, the preferred temperature in the reactor is in the range of 130-180° C. for substrates like municipal and industrial sludge qualities. However, more elevated temperatures may be beneficial for several other substrates.

After a certain period, the cooked substrate is rapidly discharged through one or more blowdown conduits to a pressure relief vessel, which is also referred to as flash tank.

In conventional batch THP plants, the outlet end of the blowdown conduit is equipped with a nozzle of a fixed (non-variable) small cross-sectional area to cause steam explosion. Thus, WO 2011/006853 (NO20092646) discloses a nozzle with non-variable cross-sectional area at the end of the blowpipe (blowdown conduit) in order to accelerate the substrate and further disintegrate the biomass at collision with a deflection plate. However, long-term exploitation of such nozzles reveals that the rapid decompression in fact occurs before the fluid reaches the deflection plate resulting in a high wear rate of the nozzle.

It is also known that in continuous plants, the blowdown rate can be controlled with a valve located in the blowdown line between the reactor and the pressure relief vessel. For instance EP 1198424 A1 discloses a continuous process including a valve and a nozzle. While a nozzle is located inside the pressure relief vessel, the valve that controls the transfer of the moist material in the form of steam and organic material is located in the pipe between the reactor and the pressure relief vessel. In such a system the drop in pressure will be distributed between the control valve in the pipe and a nozzle placed towards the end of the pipe. The provision of a control valve inside a pressure relief vessel in continuous plants has as far as is known neither been contemplated nor tested previously.

WO 2016094594 discloses a method and system for rapid pre-treatment of biomass comprising an adjustable valve located upstream a flash tank. The adjustable valve, its housing assembly with a discharge pipe and a valve shaft are in continuous contact with a high velocity fluid stream, thus subjected to erosion. The system described in WO 2016094594 is thus susceptible to rapid wear/blockage.

U.S. Pat. No. 5,628,830 discloses the treatment of polysaccharide material such as cellulose, hemicelluloses and lignocellulose by hydrolysis. There are three flow diagrams depicting the process, yet none of them refer to a process involving steam explosion and much less so to a device for regulating the discharge flow.

CN 208762396 U discloses a thermal hydrolysis flash separation device, yet there is no steam explosion aimed at sludge particle disintegration.

US 2012211512 A1 (U.S. Pat. No. 9,518,358 B2) discloses the use of multiple discharge ports in a pressurized vessel used to process biomass feed materials, an in particular an assembly of multiple valves and nozzles which replace each other in turn is described. A rotating impeller is used to move the feed material into an open discharge opening. Thus, the devices and methods disclosed in US20120211512A1 (U.S. Pat. No. 9,518,358 B2) relies on several open areas of a given magnitude operating interchangeably, and does not rely on one or more adjustable open areas as that/those of the present invention. Also, the devices and methods disclosed in US20120211512A1 (U.S. Pat. No. 9,518,358 B2) are not aimed at minimizing neither the build-up of scaling downstream of control valves, the erosion of pipework downstream of control valves, nor blockages of control valves per se. Instead the devices and methods disclosed in US20120211512A1 (U.S. Pat. No. 9,518,358 B2) are aimed at easing the continuous operation of equipment for the processing of biomass feed materials by relying on a system including several valves and nozzles which replace each other in turn, thereby allowing for the simultaneous maintenance of the valves and nozzles not in use at a given point in time.

EP 3156374 A1 discloses processes and depressurization systems for treating of organic material comprising two parallel pipes, where steam explosion occurs in the pipes (see e.g. FIG. 3 therein). Hence, the system is also susceptible to rapid wear/blockage.

WO 20018015227 A1 discloses a process for treating lignocellulosic biomass comprising a steam explosion step, in which the blow-line has a cross section restriction member which may be an orifice or a valve with an adjustable opening, such as a diaphragm valve, that allows a small flow area. This arrangement inevitably results in scaling and erosion problems in the blow-line as well as rapid wear/blockage of the valve. The adjustable valve is located in a line between the reactor and flash tank. Hence, this citation is silent about an arrangement in which an adjustable valve or a member with an adjustable open area is located at the outlet/tip of the blowdown conduit.

U.S. Pat. No. 9,103,070 B2 describes a flash tank including an inlet nozzle including a flow passage, and a movable valve plate in the flow passage, wherein the valve plate has a first position which defines a first throat in the flow passage and a second position which defines a second throat having a smaller cross-sectional area than the first throat. As is evident from the FIG. 2 of U.S. Pat. No. 9,103,070 B2 and the description (see e.g. column 1, l 10-20) the valve construction per se and not least its intended placement in the pressure relief tank (i.e. flash tank) is aimed at the processing of so-called black liquor form the pulping or biomass treatment industry, and it would not be suitable for use with a biomass in the form of a moist material having a dry solids content above 1%, a VS content of above 20%, and including abrasive material as defined herein.

None of the above citations are aimed at simultaneously minimizing the three major maintenance problems associated with the processing of moist material having a dry solids content above 1%, a VS content of above 20%, and including abrasive material, which need to be solved before one or more simple constructions each relying on e.g. a single control valve can be used to continuously regulate the discharge rate, particularly in continuous processes where the blowdown discharge rate is normally controlled with a single valve located in a single blowdown line between the reactor and pressure relief vessel:
- build-up of scaling downstream of the control valve. Scale is formed on the internal surface of the blowdown conduit downstream of the control valve. The substrate passing the valve flashes to steam which dries the material attached to the pipe surface;
- erosion of pipework downstream of the control valve. The erosion rate depends strongly on the kinetic energy of the particles hitting the wall surface. The stream velocity increases greatly after passing the control valve when the phase transition (liquid-vapor) occurs;
- blockages in the control valve. Blockages occurs when particles larger than the effective open area of the control valve or blowdown nozzle enter the blowdown conduit. Material preparation such as sieving and/or grinding prior to the reactor is unable to prevent the blockage since a large stack of particles or conglomerates of particles may be formed in the reactor.

SUMMARY OF THE INVENTION

It is therefore an object of the present invention to provide a device, which mitigates the above problems, particularly in continuous thermal hydrolysis processes plants.

It is another object of the present invention to provide a device, which mitigates the above problems, which is simple, i.e. which avoids the use of multiple valves and nozzles for each blowdown conduit, and which avoids the use of expensive wear resistant materials.

It is another object of the present invention to provide a device, which mitigates the above problems and which can be used in both continuous and batch thermal hydrolysis processes plants.

These and other objects are solved by the present invention.

Accordingly, in a first aspect the present invention provides a device for relieving the pressure of biomass upon entering a pressure relief vessel, the biomass being in the form of moist material having a dry solids content above 1%, a VS content of above 20%, and including abrasive material, particularly a mixture of steam and organic material, the system comprising a blowdown conduit for transporting said moist material into said pressure relief vessel, wherein said blowdown conduit is provided at the very end of or tip of the outlet with an adjustable/variable open area for regulating the blowdown discharge rate of said moist material into said pressure relief vessel. Thus, the device includes a blowdown conduit having at its outlet (or at one of its outlets as the case may be), i.e. at the very tip or end thereof, an adjustable open area for regulating the blowdown discharge rate.

As used herein the term "adjustable open area" should be understood to mean a technical construction fitted on or being an integral part of the blowdown line ensuring that the smallest cross sectional/opening area of the blowdown line is at the very tip of the blowdown conduit, so that expansion/spray due to flashing will take place either inside the vessel itself or in a vessel-inlet-nozzle/device (i.e. an additional inlet device through which the discharged biomass is directed from the adjustable open area into the pressure relief vessel). Any such vessel-inlet-nozzle/device should have either a large enough dimension to avoid expansion/spray hitting essential parts of the construction and thereby causing erosion, or be made from a highly resistant/durable material, such as e.g. silicon carbide. In an alternative embodiment the device may rely also on the placement of a deflection plate or a similar arrangement towards which the biomass discharged from the blowdown conduit is directed. This will ensure that primarily this dedicated deflection plate or similar arrangement is exposed to wear and tear, which may then be replaced at a low to moderate cost at necessary intervals. Otherwise the adjustment of the open area at the outlet of the blowdown conduit, i.e. the very tip or end thereof, may be achieved by any technically feasible means and/or can consist in any technical construction. However, particularly preferred solutions include a) making use of a valve of a varying cross-sectional area (see e.g. FIG. 5), or b) making use of a blowing conduit comprising at least two pipes of variable clearance of which at least one first pipe has both a close fit with and is inserted into at least one second pipe with a larger clearance and with which said first pipe is mutually rotatable, said first and second pipe defining holes i.e. apertures that overlap depending on the pipes being rotated for varying said adjustable open area (see e.g. FIG. 6). In this way the adjustable open area of a device according to the present invention enables regulation of the discharge rate of the moist material under the decompression, while avoiding build-up of scaling and erosion of the pipe as well as blockages.

As used herein the term "total solids" ("TS") includes both the total suspended solids (TSS) and dissolved salts.

As used herein the term dry solids content or dry solid weight content (expressed as a %) is determined based on the "total solids" content as this term is used herein.

As used herein the term "volatile solids" or "VS" define solids that are lost on ignition of dry solids at 550° C., i.e. the loss of weight on ignition of the total solids (the total suspended solids and dissolved salts). in the context of the present invention VS is expressed as a % of dry solids content.

As used herein the term "abrasive materials" define materials that are either hard minerals (rated at 7 or above on Mohs scale of mineral hardness) or are synthetic stones, some of which may be chemically and physically identical to naturally occurring minerals. Naturally occurring abrasives include: Calcite (calcium carbonate), Emery (impure corundum), Diamond dust (synthetic diamonds are used extensively), Novaculite, Pumice, Iron(III) oxide, Sand, Quartz, Clay Corundum, Garnet, Sandstone, Tripoli(rotten stone), feldspar, Staurolite. Artificial abrasives include: Borazon (cubic boron nitride or CBN), Concrete, Ceramic, Ceramic aluminium oxide, Ceramic iron oxide, Corundum (alumina or aluminium oxide), Dry ice, Glass powder, Steel abrasive, Silicon carbide (carborundum), Zirconia alumina, Boron carbide, Slags.

Commonly abrasive materials will have particle sizes anywhere from macroscopic grains as large as about 2 mm to microscopic grains about 0.001 mm in diameter.

In the context of the present invention abrasive materials will preferably have particle sizes >150 micron.

As used herein the term "biomass", "cooked substrate" or simply "substrate" are used interchangeably and define a "moist material", i.e. a mixture of steam or water and organic material, which has been preheated and pressurized in a reactor at 120-230° C. and 2-28 bar, preferably in a thermal hydrolysis reactor at 130-180° C. and 2.7-10 bar or even more preferably in a thermal hydrolysis reactor at 140-170° C. and 3.6-8 bar. Hence, a biomass in the form of a moist material preferably has a dry solids content above 1% or more preferably above 5%, such as in the range of 1-80% dry solids or more preferably 5-80%, such as 5-40%, and for most sludge qualities in the range of 5%-25%. The raw biomass used for the production of such a biomass in the form of a moist material would preferably be sludge from waste water treatment works, either municipal and/or industrial, but could include other substrates such as lignocellulosic biomass, municipal waste, agricultural crops, waste or byproducts, livestock waste, forestry waste, food waste, fishery and aquaculture waste, or any other substrate containing organic material in any proportion.

Preferably the VS of a moist material according to the present invention will be 20-95%, more preferably: 35-90% and most preferably 40-90%. In most applications contemplated by the present invention, VS is in the range of 45-90%.

Preferably a moist material according to the present invention will, apart from VS, include abrasive material as defined herein.

In some embodiments a moist material having a dry solids content of about 16% according to the present invention could include abrasive materials having a particle size >150 micron up to a maximum of 0.6 kg/m3 of the moist material, abrasive materials having a particle size greater than 200 micron up to a maximum of 0.3 kg/m3 of the moist material, and abrasive materials having a particle size greater than 700 microns up to a maximum of 0.03 kg/m3 of the moist material.

In other embodiments a moist material having a dry solids content of about 16% according to the present invention could include abrasive materials having a particle size >150 micron up to a maximum of 1.5 kg/m3 of the moist material, abrasive materials having a particle size greater than 700 micron up to a maximum of 0.75 kg/m3 of the moist material, and abrasive materials having a particle size greater than 4000 microns up to a maximum of 0.08 kg/m3 of the moist material.

In yet other embodiments a moist material having a dry solids content of about 16% according to the present invention could include abrasive materials having a particle size >150 micron up to a maximum of 0.2 kg/m3 of the moist material, abrasive materials having a particle size greater than 200 micron up to a maximum of 0.1 kg/m3 of the moist material, and abrasive materials having a particle size greater than 700 microns up to a maximum of 0.01 kg/m3 of the moist material.

The content of abrasive material in the above 3 groups of embodiments having a dry solids content of about 16% might also be found in other embodiments related to moist materials having a higher dry solids content. Thus, as regards the first group of embodiments another moist material having a content of about 27.5% dry solids could then include abrasive materials having a particle size >150 micron up to a maximum of 1.0 kg/m3 of the moist material, abrasive materials having a particle size greater than 200 micron up to a maximum of 0.5 kg/m3 of the moist material, and abrasive materials having a particle size greater than 700 microns up to a maximum of 0.05 kg/m3 of the moist material.

As used herein, the terms "raw biomass" and "raw substrate" are used interchangeably and define an organic material, which has not been preheated and/or pressurized in a reactor in accordance with the above.

As used herein, the term "outlet" (outlet of the one or more blowdown conduit), means the end or tip of the actual blowdown conduit where the biomass is being discharged, i.e. there is as a starting point no further piping downstream of the "outlet" of the blowdown conduit. As explained above, however, the "outlet" may be equipped with e.g. a vessel-inlet-nozzle/device (i.e. an additional inlet device through which the discharged biomass is directed from the adjustable open area at the "outlet" into the pressure relief vessel). Any such vessel-inlet-nozzle/device should have either a large enough dimension to avoid expansion/spray hitting essential parts of the construction and thereby causing erosion, or be made from a highly resistant/durable material, such as e.g. silicon carbide.

In an embodiment according to the first aspect of the invention, one or more of the one or more blowdown conduits includes a valve being adapted at said outlet of said blowdown conduit, said valve having a variable open, e.g. cross-sectional, area.

The present invention, thus, inter alia relates to a device in which a valve is provided at the very end of or tip of the outlet of one or more blowdown conduits for regulating the discharge rate of the moist material and which is capable of varying the size of the cross-sectional area from preferably a fully open to fully closed positions, thus allowing the blowdown process to be conducted continuously. The valve is adapted at the outlet i.e. at the tip or the end, of the one or more blowdown conduits, hence there is as a starting point no piping downstream of the valve. The adjustable open area should be constructed in such a way that it ensures that the smallest cross sectional/opening area of the blowdown conduit is at the very tip of the blowdown conduit, so that expansion/spray due to flashing will take place either inside the pressure vessel itself or in a vessel-inlet-nozzle/device (i.e. an additional inlet device through which the discharged biomass is directed from the adjustable open area into the pressure relief vessel). Any such vessel-inlet-nozzle/ device should have either a large enough dimension to avoid expansion/spray hitting essential parts of the construction and thereby causing erosion, or be made from a highly resistant/durable material, such as e.g. silicon carbide. Alternatively the device may rely also on the placement of a deflection plate or a similar arrangement towards which the biomass discharged from the blowdown conduit is directed. Surprisingly, in a simple and elegant manner, the severe maintenance problems mentioned above are thereby mitigated.

The device, i.e. valve, can also be used for batch processes.

The device according to the invention also enables continuous adjustment of the discharge rate to the desired level and to maintain the desired liquid volume inside the pressure relief vessel at a wide capacity range.

In another embodiment according to the first aspect of the invention, the blowdown conduit is integral with said valve. This enhances simplicity and ease of construction and installation.

In another embodiment according to the first aspect of the invention, the device comprises a plurality of valves placed on a plurality of blowdown conduits operating in concert each of which has an adjustable open, e.g. cross-sectional, area. Thus, one or more valves operating in concert each of which has an adjustable open, e.g. cross-sectional, area may be arranged at the outlet of a plurality of blowdown conduits.

In another embodiment according to the first aspect of the invention, the one or more blowdown conduits are arranged inside said pressure relief vessel in a manner aimed at avoiding that the discharged biomass hits any parts of said pressure relief vessel and the one or more valves are oriented towards discharged biomass being collected as a liquid in said pressure relief vessel. In a further embodiment the one or more blowdown conduits are arranged in one or more inlet-nozzle/devices to said pressure relief vessel, said one or more inlet-nozzle/devices having a dimension large enough to avoid the discharged biomass hitting any parts of said one or more inlet-nozzle/device, and wherein said valves are oriented towards discharged biomass being collected as a liquid in said pressure relief vessel. In an alternative embodiment the device may rely also on the placement of a deflection plate or a similar arrangement towards which the biomass discharged from the blowdown conduit is directed. This will ensure that primarily this dedicated deflection plate or similar arrangement is exposed to wear and tear, which may then be replaced at a low to moderate cost at necessary intervals. All of these embodiments avoid destructive contact between the fluid stream, i.e. moist material being discharged, and the wall of the pressure relief vessel. Also, the distance between the valve in the blowdown conduit and the level of liquid level in the pressure relief vessel should be large enough to avoid unwanted splashing inside the vessel. A skilled person in the art would be able to readily define such distance.

In another embodiment according to the first aspect of the invention, said valve is in the form of a valve arrangement comprising:

- a supporting element affixed to a wall of said blowdown conduit,
- a displaceable rod adapted to cooperate with said supporting element,
- a movable part mounted on said adjustable rod,
- a static part having a shape corresponding to that of the movable part for blocking the flow of said biomass upon contact with said movable part.

This particular embodiment further prevents the development of flash steam prior to, i.e. upstream, the outlet of the blowdown conduit.

Preferably, said static part is in the form of a constriction provided at the outlet of the blowdown conduit. The static part thus extends until the end of the blowdown conduit.

In a particular embodiment, said movable part is a cone which defines a cone slope, and said shape of the static part corresponding to that of the movable part defines a slope which is equal to, or higher i.e. steeper than said cone slop. Especially when the cone slope is steeper compared to the static part, it is ensured that that the minimum open cross-sectional area always coincides with the circular ring ($S_{AC}$—see FIGS. 5A and 5B) of the blowdown valve. As a result, the wear and tear on the static part is reduced with increasing of protrusion of the movable part into the steam explosion zone and thereby imposing an extra load on the movable part.

In another particular embodiment, said movable part is made of material with high erosion resistance, such as silicon carbide to minimize erosion rates as this part will be subjected to the most violent operating conditions.

To further prevent blockages, a mesh with smaller openings than the smallest opening in an adjustable valve must be in place upstream of the adjustable valve. Alternatively, the inlet pipe can face a surface at a distance smaller than the smallest opening size in the adjustable valve of the blowdown conduit. For instance, when the discharge device is only partially open, the distance from the static part to the movable part can be as small as a few millimeters. If particles become stuck in the device, the movable part can be moved to a position where the opening of the static part will have the smallest diameter of any section where substrate is present prior to the outlet. This will make it possible to dislodge stuck particles to re-establish flow through the valve by retracting the movable part. With this configuration, particles larger than those that can be passed through the valve in the blowdown conduit remain in the reactor and are removed during scheduled maintenance stops.

Several other possible designs for blowdown valves where the minimum cross-sectional area is located at the tip of the blowdown conduit or with sacrificial material downstream the minimum open cross-sectional area, where the steam explosion takes place, could be contemplated. Any design should ensure that the position of the valve gate coincides with the tip or the end, of the blowdown conduit. Hence there should either be no piping downstream of the valve or it should be fitted with a vessel-inlet-nozzle/device (i.e. an additional inlet device through which the discharged biomass is directed from the adjustable open area into the pressure relief vessel) having either a large enough dimension to avoid expansion/spray hitting essential parts of the construction and thereby causing erosion, or made from a highly resistant/durable material, such as e.g. silicon carbide. Alternatively, a device according to the present invention may rely also on the placement of a deflection plate or a similar arrangement towards which the biomass discharged from the blowdown conduit valve is directed.

In yet another embodiment according to the first aspect of the invention, one or more of the one or more blowdown conduits comprise a first pipe and a second pipe which are mutually rotatable, said first pipe being provided with a close sliding fit inside said second pipe, said first and second pipe defining holes i.e. apertures that overlap depending on the pipe being rotated for varying said adjustable open area. Hence, by rotating one pipe, the effective open area can be adjusted. This embodiment requires no valves and thereby use of expensive mechanical parts and which are exposed where steam explosion takes place.

An arrangement having two or more sets of mutually rotatable pipes is also envisaged. Preferably, the blowdown conduits are arranged inside said pressure relief vessel in a manner aimed at avoiding that the discharged biomass hits any parts of said pressure relief vessel. Alternatively, the biomass discharged from the blowdown conduits may be directed towards a deflection plate or a similar arrangement.

According to a second aspect of the invention, there is also provided a plant for thermal hydrolysis of raw biomass comprising a thermal hydrolysis reactor for producing a moist material under pressure, a pressure relief vessel in fluid communication with said reactor for relief of pressure of said moist material, and one or more devices in accordance with the above at the outlet of the blowdown conduit (s), i.e. which are capable of regulating the discharge rate of the moist material by adjusting the size of the open, e.g. cross-sectional, area of the blowdown conduit(s) from preferably a fully open to fully closed positions, and being adapted at the outlet i.e. at the tip or the end, of the actual blowdown conduit(s).

DETAILED DESCRIPTION

Figure 1A:
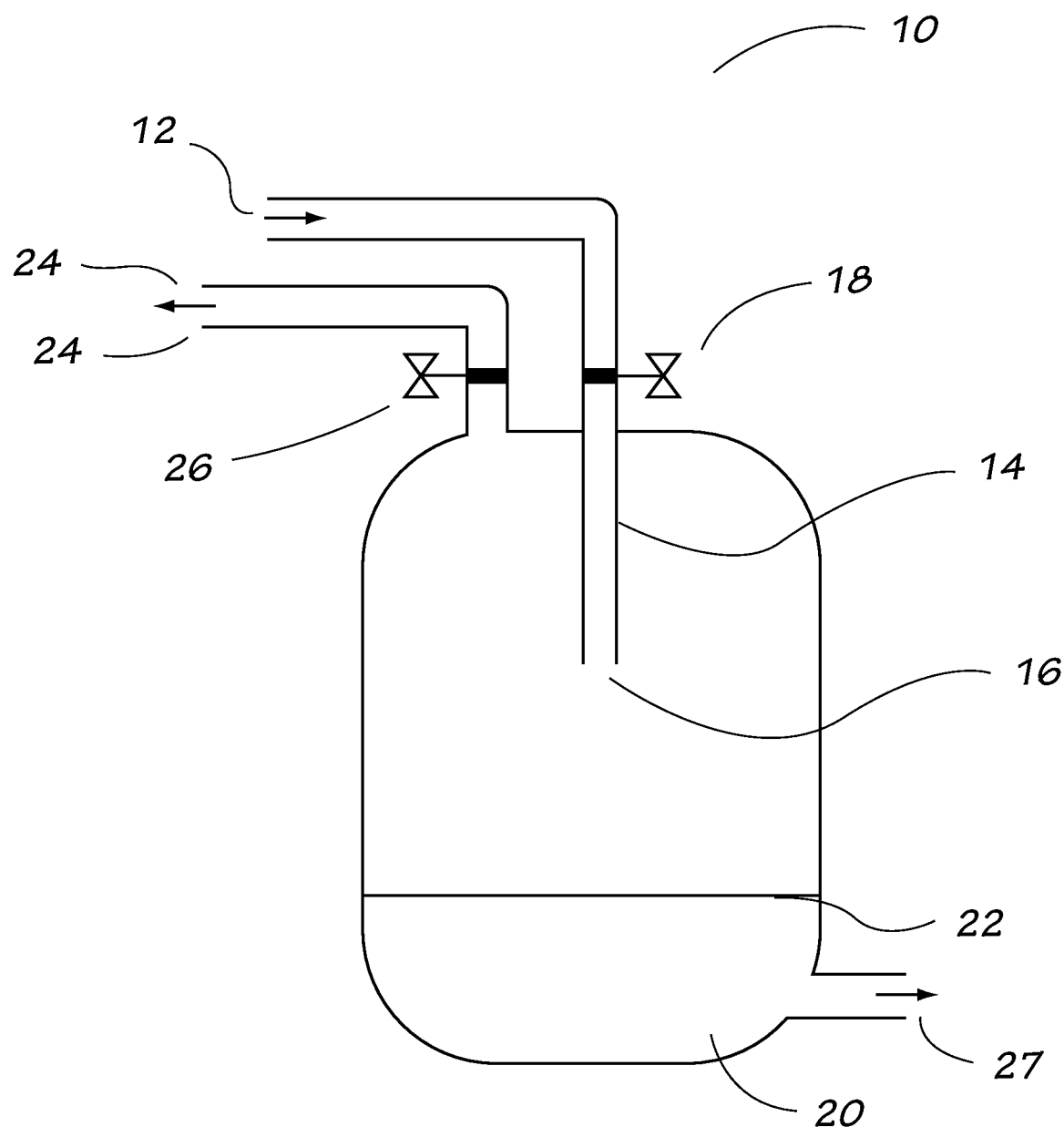
FIG. 1A shows a schematic layout of a pressure relief vessel i.e. flash tank according to the prior art.
Figure 1B:
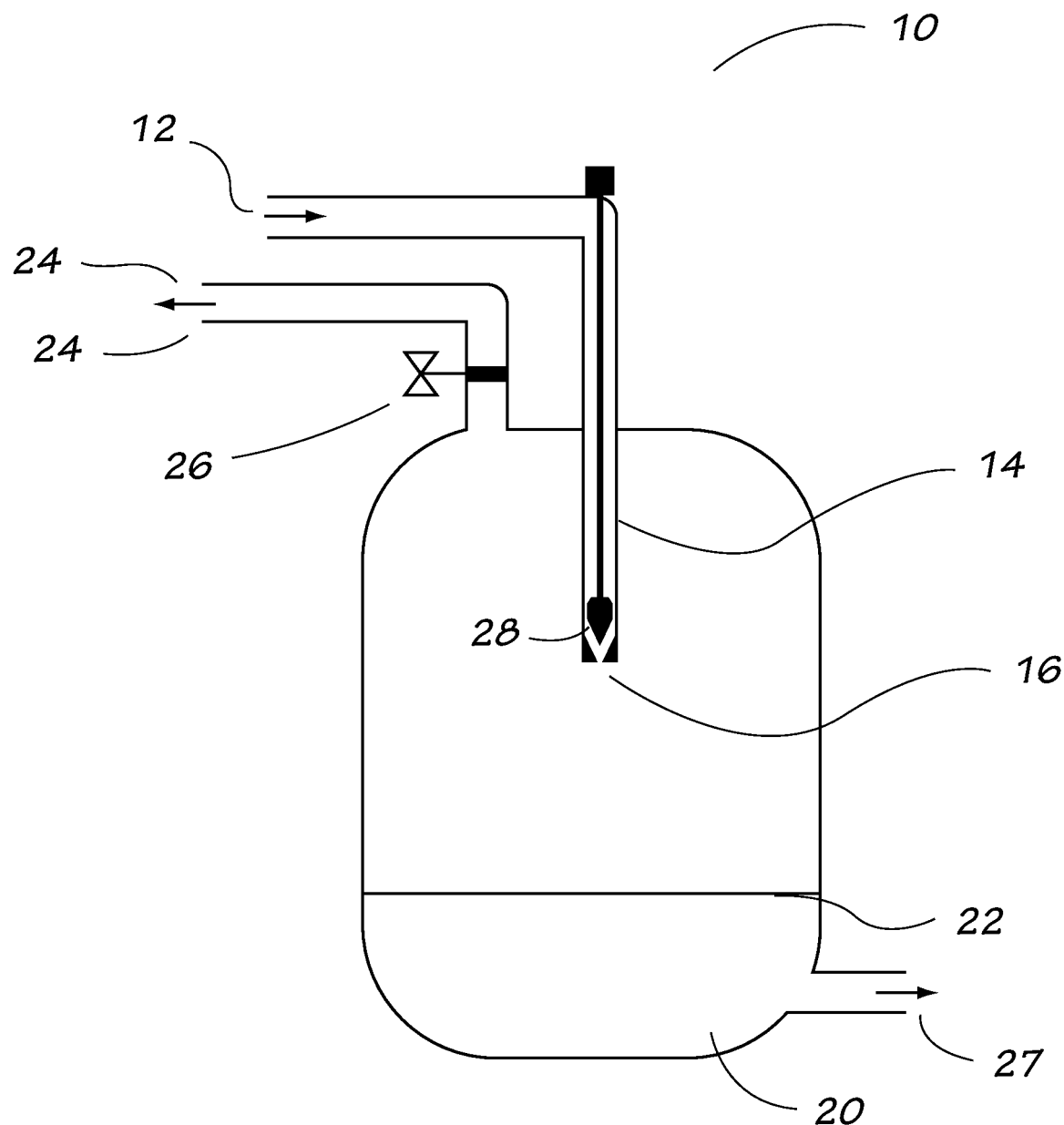
FIG. 1B shows a schematic layout of a pressure relief vessel i.e. flash tank according to the present invention.

FIG. 1A shows a typical pressure relief vessel, i.e. flash tank 10. High-pressure steam explosion is a process of rapid release of pressurized water or water-rich material 12 as shown by the arrow, normally conducted through a nozzle or an orifice. This process is known also as blowdown, explosive decompression, rapid depressurization, etc. and results in a rupture of the moist material and make it more accessible for subsequent processes, e.g. digestion or dewatering. For this purpose, a raw substrate is first compressed in a reactor, passes through the blowdown conduit 14 and then discharges from a nozzle 16 of the blowdown conduit 14 into the pressure relief vessel 10. The flow rate through the nozzle, i.e. the blowdown discharge rate of the moist material, depends on many parameters such as inlet and outlet pressures, critical pressure and molar volume of the substrate, orientation of the vessels, location of the nozzle, discharge coefficient, etc. The blowdown conduit includes also a valve 18, which according to the prior art would normally be located between the reactor (not shown) and the pressure relief vessel 10 (FIG. 1A), whereas in a device according to the present invention this would be in a position where the valve gate coincides with the tip or the end, of the blowdown conduit (FIG. 1B). Hence in a device according to the present invention there should either be no piping downstream of the valve 28 (FIG. 1B) or the valve should be fitted with a vessel-inlet-nozzle/device (i.e. an additional inlet device through which the discharged biomass is directed from the adjustable open area into the pressure relief vessel) having either a large enough dimension to avoid expansion/spray hitting essential parts of the construction and thereby causing erosion, or made from a highly resistant/durable material, such as e.g. silicon carbide. After steam explosion, substrate being discharged is collected as a liquid 20 in the flash tank and defines a liquid level 22. The flash tank 10 comprises also a conduit for allowing a flash stream 24 to exit with the aid of valve 26 and a conduit 27 allowing for the exit of the liquid 20 from the vessel.

A series of large-scale measurements of the blowdown rate as a function of the cross-sectional area of the nozzle 16 and inlet pressure for a chosen design has been performed. In all experiments, substrate 12 containing 13% dry solids originating from municipal sludge or food waste was transferred from the reactor to a blowdown nozzle 16 with minimal pressure losses. The blowdown nozzle 16 of different diameters was placed in a vertical position in the upper area as shown in the figure and inside the flash tank 10 and oriented towards already treated liquid material 20. The line prior to the blowdown nozzle 16 was relatively large (110 mm Ø) and the minimum open area of the nozzle was located at the very tip of the blowdown nozzle 16. The diameter of the flash tank 10 was larger than 1400 mm Ø. The flow rate through the blowdown nozzle 16 was calculated as the ratio of the volume of the liquid in the reactor to the blowdown time, which were estimated based on the pressure sensor readings and level measurement in the pressure relief vessel.

Figure 2:
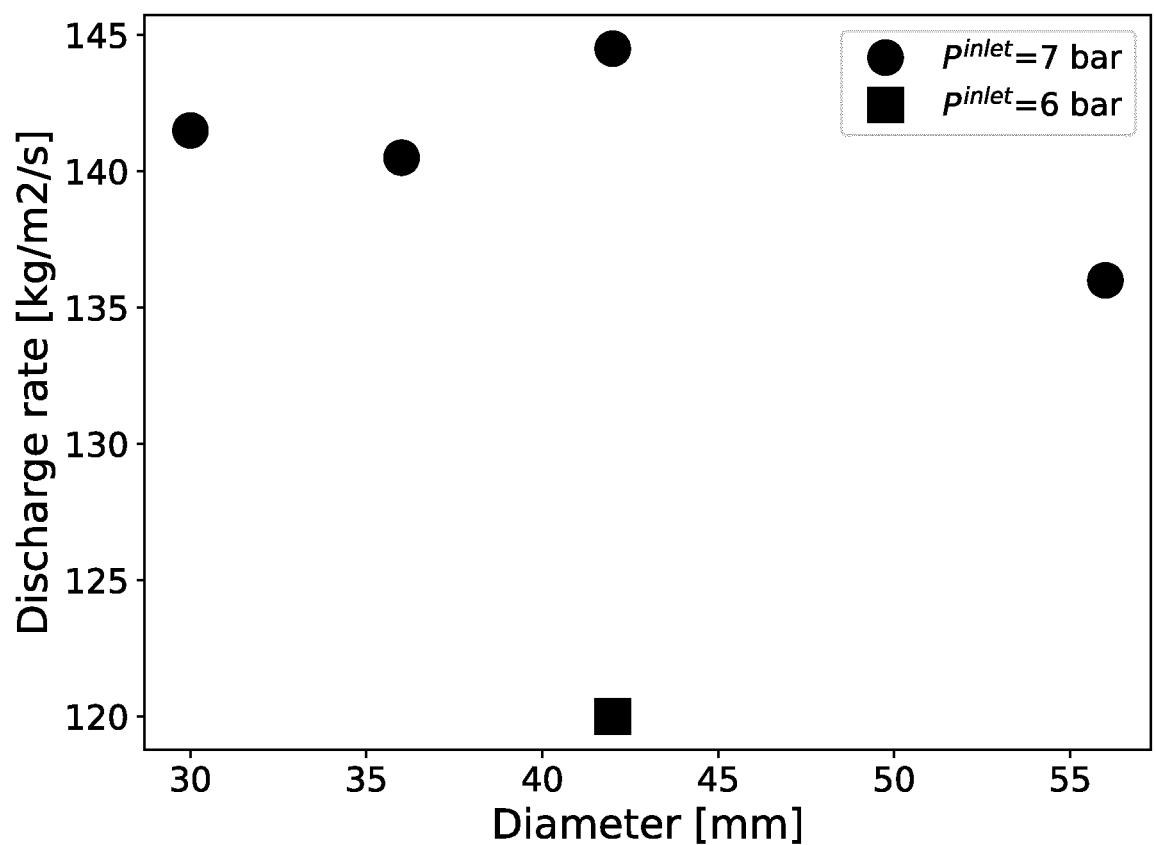
FIG. 2 shows the flow rate, i.e. the discharge rate of moist material (mixture of steam an organic material) through a nozzle versus nozzle diameter according to the prior art.

FIG. 2 shows the results for different diameters of the nozzle. The circle and square symbols correspond to the inlet pressure of 7 and 6 bar, respectively. The X-axis shows the nozzle diameter in mm and the Y-axis shows the average flow rate in kg/m2/s. The outlet pressure was fixed at 2 bar. As can be seen the experiments confirmed that the discharge rate is directly proportional to the cross-sectional area of the nozzle and decreases with the inlet pressure. However, the determination of the actual flow rate as e.g. ~140 kg/m2/s at an inlet pressure of 7 bar and an outlet pressure of 2 bar allows for the determination of the flow coefficient ($C_V$), as a function of the cross-sectional area.

$C_V$ can be computed as follows:

$$C_V = 0.366 \cdot Q \sqrt{\frac{G_L}{P_1 - P_2}}$$

where Q is the volumic flow rate (m3/h); $G_L$ is the liquid relative density (taken as 1); $P_1$ and $P_2$ are the inlet and outlet pressure, respectively.

Knowledge of the relationship between flow coefficient ($C_r$) and cross-sectional area makes it possible to control the discharge rate at different valve openings for a given moist material, in this case municipal sludge or food waste containing 13% dry solids The average velocity through the choke point in the nozzle for liquid and the two-phase gas and liquid flow prior to and after steam explosion is calculated as 7 m/s and 500 m/s, respectively.

It should be noted, that harsh operation conditions cause undesirable changes in the equipment and thus affect the performance, durability and reliability of the plant. Among them, we identify those caused by erosion, scaling and blockage.

Re. Erosion:

To prevent erosion the fluid velocity in pipework or a vessel should not exceed a certain value depending on the material. Our observations show that the erosion rate in 316 stainless steel is negligible for the average steam velocities below 20 m/s. However, under the conditions of the experiment described above, the average velocity after steam explosion is about 500 m/s, i.e. more than one order of magnitude higher.

Mandipoor et al. (*Scientific Reports* 5: 14182 (2015) www.doi.org/10.1038/srep14182) have investigated the impact of high-speed water droplet of different sizes on the erosion of titanium alloys. Their experiments revealed a power law dependence (ER~$V^n$) between the erosion rate and droplet speed. Here n is between 7-13 depending on the alloy composition. Particularly, the results indicate that 1 mm$^3$ of water droplets at V=275-350 m/s causes $10^{-6}$-2× $10^{-4}$ mm$^3$ of the material loss. Here the material loss is defined as the difference in volume between the as-received specimen and the eroded specimen. In the context of the present invention, even a greater erosion rate may occur, since the discharge stream contains inorganic abrasive particles such as sand and its velocity is higher.

Figure 3A:
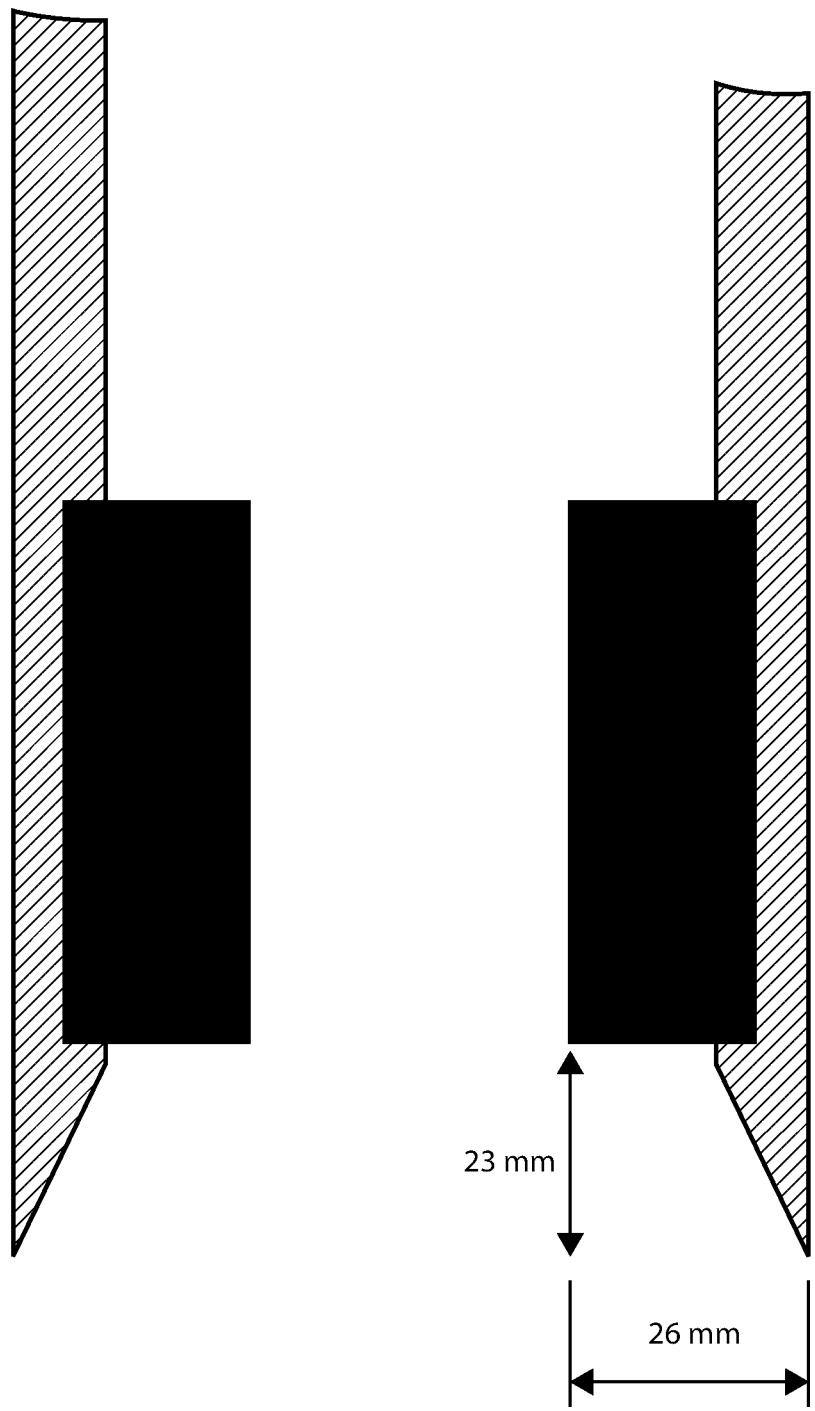
FIG. 3A shows erosion of a pipe on the discharge side of a blowdown nozzle according to the prior art.

To quantify the erosion rate under our conditions the following experiment was conducted. A pipe made of 316 stainless steel with an outer diameter of 88 mm and wall thickness of 15 mm was installed directly after a blowdown nozzle made of hardened carbon steel. The inner diameter of the pipe downstream the nozzle was 58 mm while the blowdown nozzle had an inner diameter of 36 mm. This results in a distance of 11 mm from the opening of the blowdown nozzle to the pipe wall. The pressure and temperature on the entry side and discharge side of the blowdown nozzle was 7 bar and 165° C. and 2 bar and 120° C., respectively. There were no visible or measurable signs of erosion in the blowdown nozzle or on the entry side of the nozzle after a total blowdown time of about 1000 hours. In the same plane as the end of the blowdown nozzle, the downstream pipe appeared to be polished, but there was no measurable loss of material. However, at 23 mm distance from the blowdown nozzle, the originally 15 mm thick steel pipe was completely eroded, and a sharp edge was formed. This erosion pattern is illustrated in FIG. 3A.

Figure 3B:
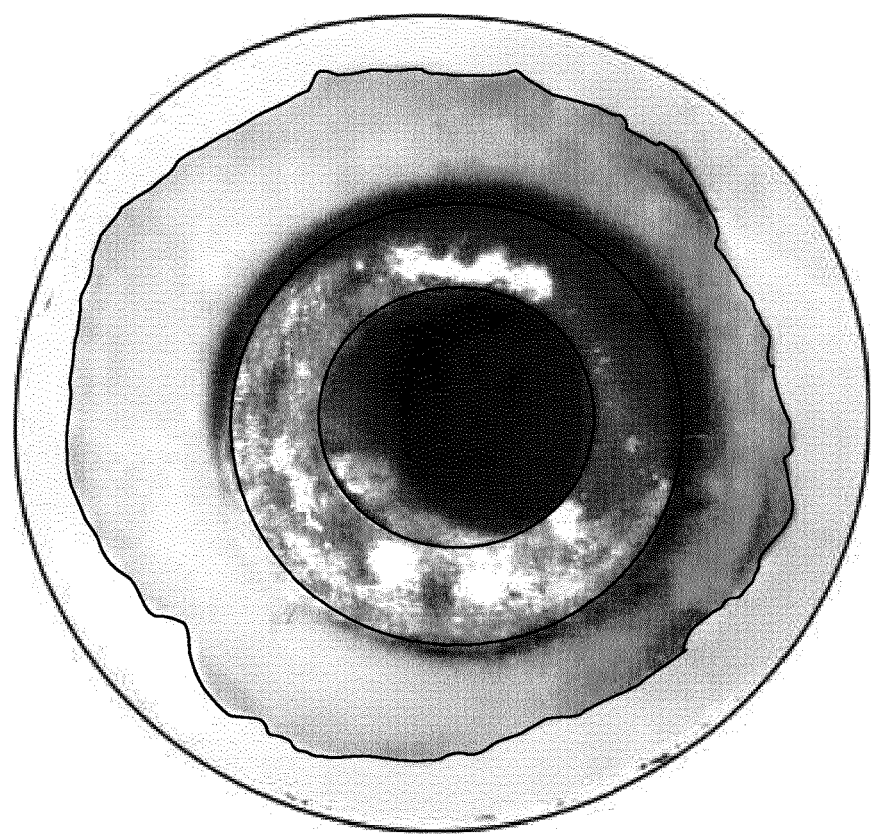
FIG. 3B shows the discharge side (FIG. 3Ba) and entry side (FIG. 3Bb) of a blowdown nozzle according to the prior art, thus having a piping upstream and downstream the nozzle.
Figure 3B:
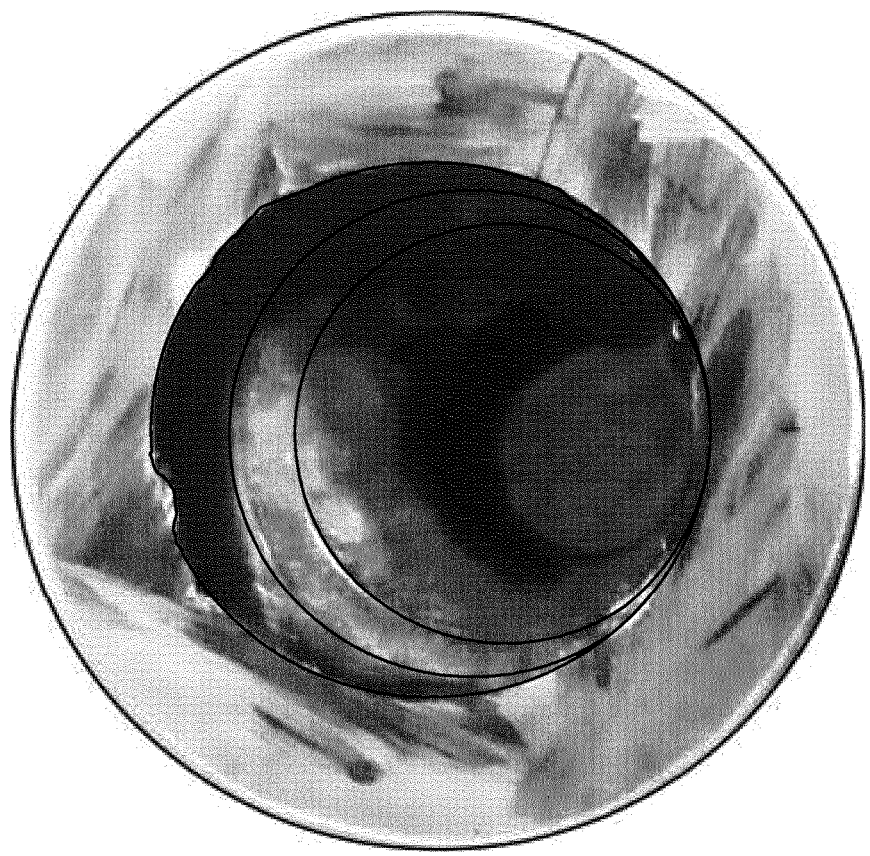

FIG. 3Ba shows the discharge side and FIG. 3Bb shows the entry side of the blowdown nozzle made of hardened carbon steel and having piping upstream and downstream the nozzle. Similar erosion might take place downstream control valves if there is insufficient distance to any solid surfaces downstream the plane where development of flash steam takes place. Furthermore, this illustrates the difficulties with using a control valve with piping upstream and downstream the valve to regulate the discharge rate from a reactor in a THP plant.

To avoid destructive contact between the fluid stream and walls of the flash tank, the blowdown nozzle is oriented towards already treated liquid material. For the same reason the distance between the blowdown nozzle and the liquid level (see FIG. 1) should be large enough due to possible splashing inside the flash tank.

Figure 4:
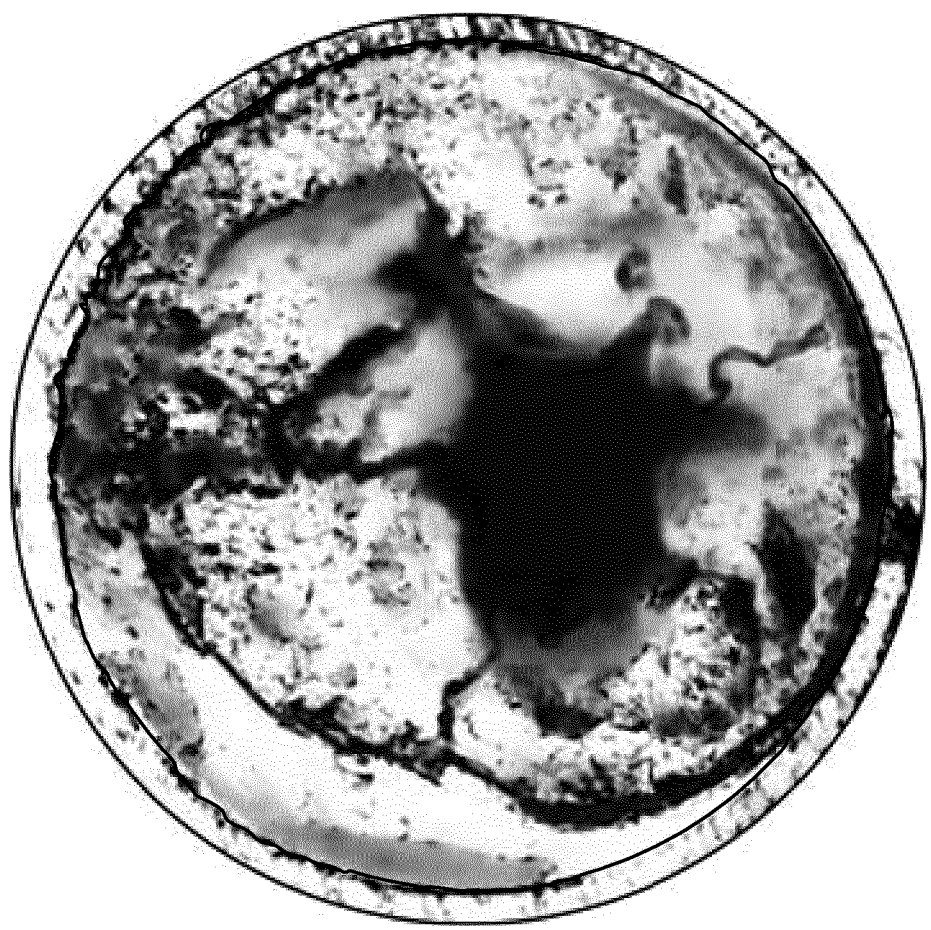
FIG. 4 shows scaling caused by the drying effect of superheated steam in the piping downstream a control valve, in accordance with the prior art.

Re. Scaling:

In a different test a pipe with an inner diameter of 57 mm was placed after a control valve used to control the discharge rate for a THP reactor. Municipal sludge at about 8% DS was discharged at an average rate of about 0.05 m$^3$/min through the control valve. This results in superheating of the flash steam which facilitates drying of solid material attached to pipe walls. This causes scaling and eventually blockages in piping downstream the control valve as shown in FIG. 4.

The effects of scaling can be mitigated by placing the blowdown nozzle or the part of a control valve used to regulate the discharge rate at the very end of pipework located inside a significantly larger pipe or inside a pressure vessel. Scaling will also occur in such a scenario, but formation of scaling is a relatively slow process. If the pressure relief vessel or piping downstream the control valve or restriction has a sufficiently large diameter, then scaling needs to be removed at reasonable time intervals such as during planned and scheduled annual maintenance stops.

Re. Blockages

To prevent blockages, a mesh with smaller openings than the open area of a static nozzle or the smallest opening in an adjustable nozzle must be in place upstream of the the open area of a static nozzle or the smallest opening in an adjustable nozzle. Alternatively, the inlet pipe can face a surface at a distance smaller than the smallest opening size in a static or adjustable blowdown nozzle. When the discharge device shown in FIG. 1B is only partially open, the distance from the static part to the movable part can be as small as a few millimeters. If particles become stuck in the device, the movable part can be lifted to a position where the opening of the static part will have the smallest diameter of any section where substrate is present prior to the outlet. This will make it possible to dislodge stuck particles to reestablish flow through the nozzle by retracting the movable part. With this configuration, particles larger than those that can be passed through the blowdown nozzle remain in the reactor and are removed during scheduled maintenance stops.

Figure 5A:
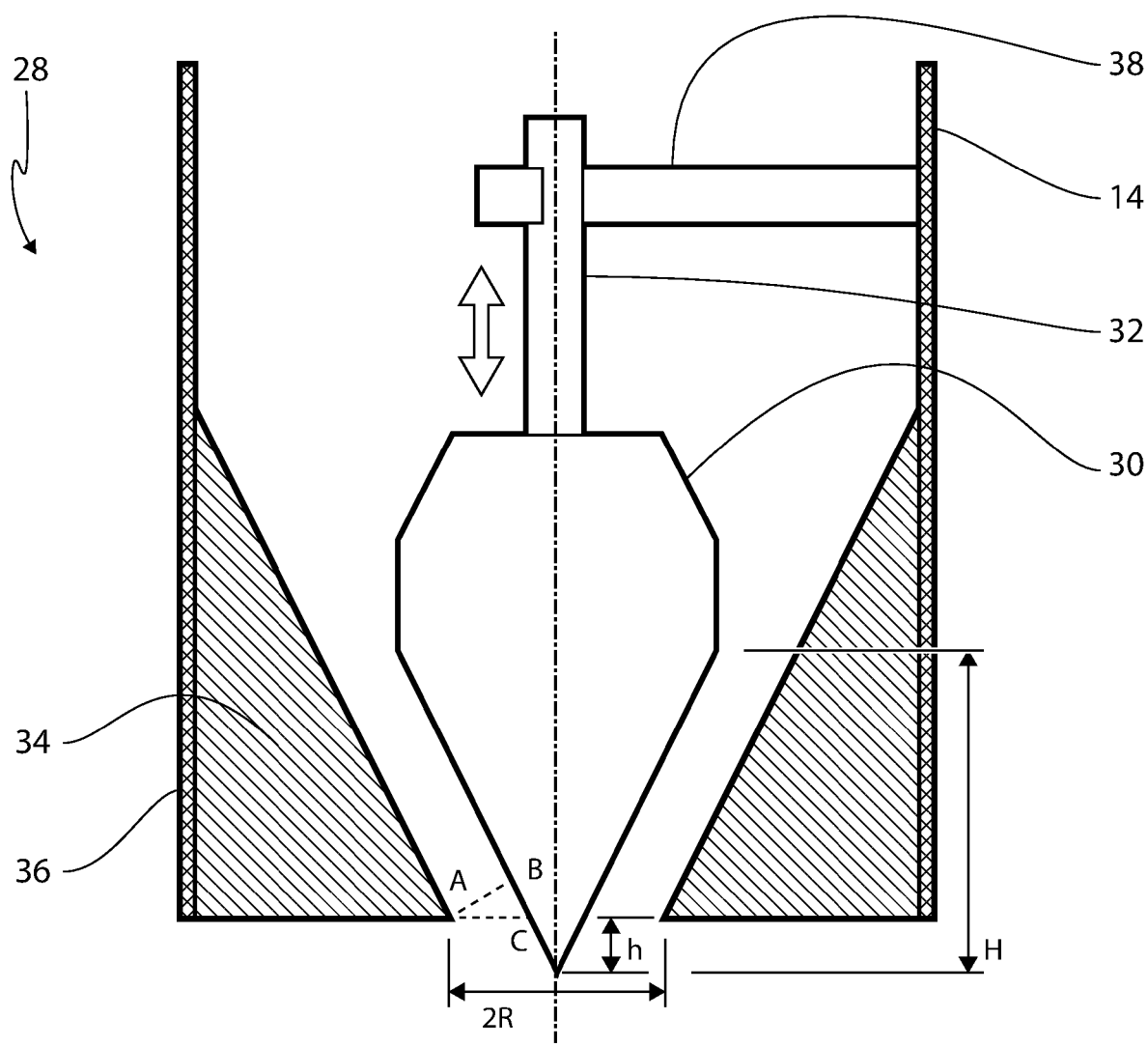
FIGS. 5A, 5B and 5C show a particular embodiment according to the first aspect of the present invention, where the valve is located at the end of the blowdown conduit, i.e. at the outlet or tip thereof.
Figure 5B:
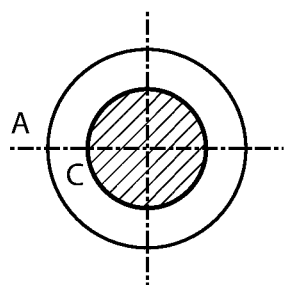
Figure 5C:
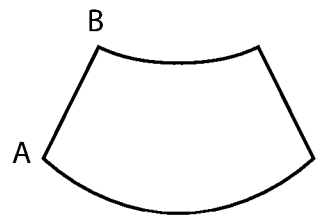

Now, with reference to FIG. 5, a device for adjusting the blowdown rate according to the present invention is shown. In FIG. 5A, the adjustable valve 28 at the outlet of the blowdown conduit 14 as shown in the figure, includes of a movable part 30 mounted on an adjustable rod 32 and a static part 34 which repeats the shape of the movable part 30 to block the fluid flow upon contact with the movable part 30. The static part 34 as shown by the hatched area is permanently fixed to wall of the blowdown conduit 14, this preferably being in form of a thick-walled pipe 36, while the movable part 30 can travel, preferably only vertically, by displacing the rod as shown by the arrows. A supporting element 38 affixed to the wall of the blowdown conduit 16, preferably as rod support rings prevent any movements except the vertically applied displacements. In this example, the tip of the movable part 30 is a right circular cone with radius R and height H. The distance 2R corresponds to the opening at the outlet as also shown in the figure. The fluid passes through a cross-sectional area (S) formed between the cone and the static part. This can either be a circular ring created by rotating the segment AC (see FIG. 5B) around the vertical axis or a lateral surface of a newly formed cut cone with a slant height of AB (see FIG. 5C). Mathematically, this can be expressed as:

$$S = \min(S_{AB}, S_{AC}) = \min\left(\frac{\pi R(H-h)(H(h+H)+2R^2)}{\sqrt{1+H^2/R^2}(H^2+R^2)}, \pi R^2 - \frac{\pi h^2 R^2}{H^2}\right)$$

for $h = 0..H$.

Here h describes the vertical position of the movable part 30 with respect to the static part 34 and is chosen such that h=H when the cone is completely pressed to the static part.

Such arrangement helps to prevent development of flash steam prior to the outlet of the device. In this context, it is advantageous to make the cone in a hard material such as silicon carbide to minimize erosion rates as this part will be subject to the most violent operation conditions.

It is preferred, that the slope of the movable part (cone) 30 ($\tan^{-1} R/H$) is steeper compared to the static part 34. This ensures that the minimum open cross-sectional area always coincides with the circular ring ($S_{AC}$) of the blowdown nozzle. As a result, the wear and tear on the static part is reduced with increasing of protrusion of the movable part 30 into the steam explosion zone, as also shown in FIG. 5A, and thereby imposing an extra load on the movable part 30.

Figure 6:
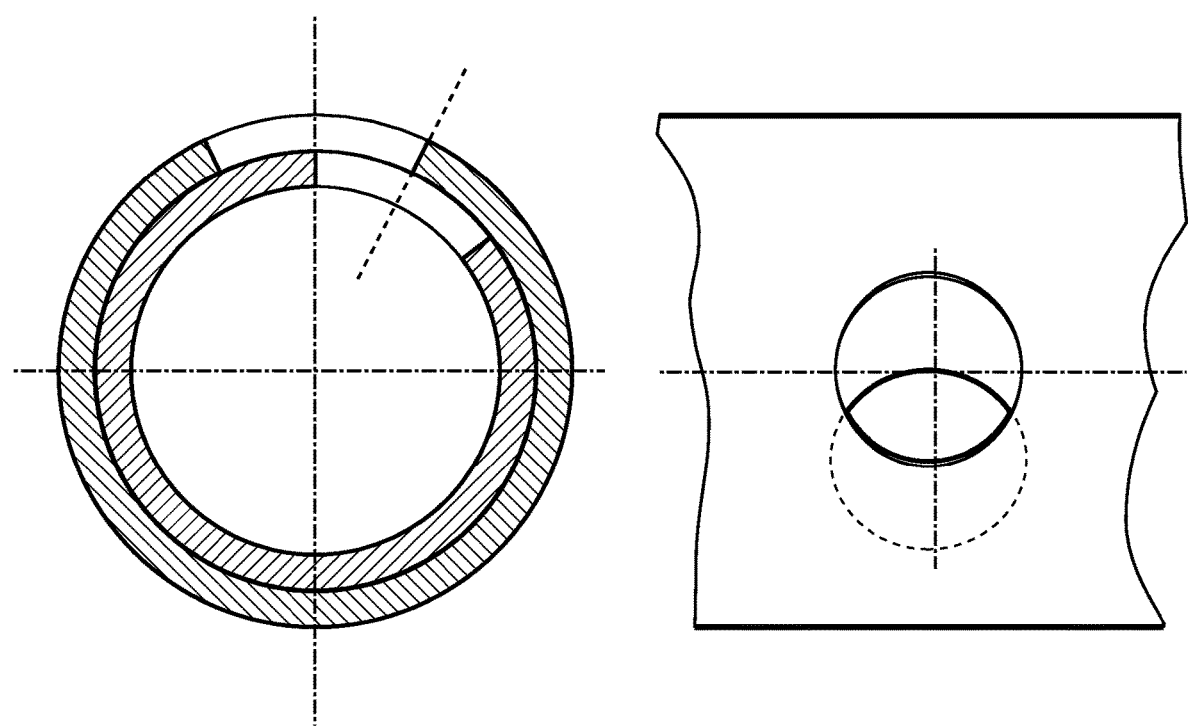
FIG. 6 shows another particular embodiment according to the first aspect of the present invention, where the blow conduit comprises two rotating pipes (side view). Maximum opening corresponds to coincidence of the holes of the pipes.

With reference to FIG. 6, another embodiment according to the invention is shown by fitting a pipe with a close sliding fit inside a somewhat larger pipe where both pipes have holes that will overlap depending on the position of the pipe that can be rotated as also shown in in the figure. By rotating one pipe, the effective open area can be adjusted.

The present invention thus encompasses a detailed arrangement of a valve to regulate the flow rate under the decompression. This is most relevant for a continuous THP plant but can also be used for batch process plants. A key feature of the device according to the present invention compared to the prior art is the improved resistivity to erosion and blockage, by the adjustable valve controlling the discharge rate being placed at the outlet end of the blowdown conduit (blowdown line).

LIST OF PARTS

10 Pressure relief vessel (flash tank)
12 Moist material (biomass, substrate)
14 Blowdown conduit
16 Blowdown nozzle
18 Valve
20 Liquid collected in flash tank 10
22 Liquid level
24 Flash stream
26 Valve
27 Sludge outlet conduit
28 Valve arrangement at outlet of blowdown conduit 14
30 Movable part
32 Adjustable rod
34 Static part
36 Thick-walled pipe
38 Supporting element

The invention claimed is:

1. A device for relieving the pressure of biomass upon entering a pressure relief vessel, the biomass being in the form of moist material including abrasive material having a particle size >150 micron and rated at 7 or above on Mohs scale of hardness, and having a dry solid content above 5% whereof above 20% is volatile solids (VS), the device comprising one or more blowdown conduits for transporting said biomass in the form of moist material from a reactor to said pressure relief vessel and discharging said biomass in the form of moist material into said pressure relief vessel, wherein:
    said one or more blowdown conduits are either oriented towards a sacrificial material or towards an already discharged biomass collected inside said pressure relief vessel, or are arranged to discharge into one or more additional inlet devices to said pressure relief vessel, wherein each additional inlet device is either made from durable material or has a dimension large enough to avoid discharged biomass hitting any parts of said one or more additional inlet devices, and
    said one or more blowdown conduits each has a transverse cross-sectional area and is provided at an outlet thereof with a valve having a variable cross-sectional area providing an adjustable open area for:
        a) regulating the blowdown discharge rate of said biomass in the form of moist material into said pressure relief vessel, and
        b) providing an opening area to the corresponding one of said one or more blowdown conduits at the outlet, wherein said opening area is smaller than the transverse cross-sectional area.

2. The device according to claim 1, wherein said valves being adapted at said outlet of said one or more blowdown conduits are an integral part of said one or more blowdown conduits.

3. The device according to claim 1, comprising a plurality of blowdown conduits each being adapted with valves at said outlet of said blowdown conduits.

4. The device according to claim 1, wherein said valves are in the form of a valve arrangement comprising:
    a supporting element affixed to a wall of said blowdown conduit;
    a displaceable rod adapted to cooperate with said supporting element;
    a movable part mounted on said adjustable rod; and
    a static part having a shape corresponding to that of the movable part for blocking the flow of said biomass in the form of moist material upon contact with said movable part.

5. The device according to claim 4, wherein said movable part is a cone which defines a cone slope, and said shape of the static part corresponding to that of the movable part defines a slope which is equal to, or higher than said cone slope.

6. The device according to claim 4, wherein said movable part is made of material with high erosion resistance.

7. The device according to claim 6, wherein the material with high erosion resistance is silicon carbide (SiC).

8. The device according to claim 1, wherein one or more of said one or more blowdown conduits comprise a first pipe and a second pipe which are mutually rotatable, said first pipe being provided with a close sliding fit inside said second pipe, said first and second pipe defining holes/apertures that overlap depending on the pipe being rotated for varying said adjustable open area.

9. The device according to claim 1 further comprising a mesh with smaller openings than the smallest cross sectional/opening area of said one or more adjustable open areas at the outlet of said one or more blowdown conduits, said mesh being placed upstream of the outlet of said one or more blowdown conduits.

10. A plant for producing a pretreated biomass by subjecting raw biomass to thermal hydrolysis, said plant comprising a thermal hydrolysis reactor for producing biomass under pressure in the form of a moist material including abrasive material having a particle size >150 micron and rated at 7 or above on Mohs scale of hardness, and having a dry solid content above 5% whereof above 20% is volatile solids (VS), a pressure relief vessel in fluid communication with said reactor for relief of pressure of said moist material, and one or more devices according to claim 1.

11. A method for thermal hydrolysis of raw biomass comprising:

subjecting said raw biomass to thermal hydrolysis thereby producing biomass in the form of a moist material under pressure; and transferring said biomass to a pressure relief vessel for relief of pressure of said moist material;

characterized in that:

said moist material has a dry solid content above 5% whereof above 20% is volatile solids (VS) and that it includes abrasive material having a particle size >150 micron and rated at 7 or above on Mohs scale of hardness, and said transfer of said biomass to said pressure relief vessel is achieved by use of a device comprising one or more blowdown conduits for transporting said biomass in the form of moist material from a reactor to said pressure relief vessel and discharging said biomass in the form of moist material into said pressure relief vessel, wherein said one or more blowdown conduits either oriented towards a sacrificial material or towards already discharged biomass collected inside said pressure relief vessel, or are arranged to discharge into one or more additional inlet devices to said pressure relief vessel, wherein each additional inlet device is either made from a durable material or has a dimension large enough to avoid discharged biomass hitting any parts of said one or more additional inlet devices, and wherein each of said one or more blowdown conduits has a transverse cross-sectional area and is provided at the outlet thereof with a valve having a variable cross-sectional area providing an adjustable open area for:

a) regulating the blowdown discharge rate of said biomass in the form of moist material into said pressure relief vessel; and b) providing an opening area of to the corresponding one of said one or more blowdown conduits at the outlet, wherein said opening area is smaller than the transverse cross-sectional area.

12. The method according to claim 11, wherein said valves are oriented towards one or more wear plates, wear devices, or deflection plates.

13. The method according to claim 11, wherein said one or more valves are in the form of a valve arrangement comprising:

a supporting element affixed to a wall of said blowdown conduit;

a displaceable rod adapted to cooperate with said supporting element;

a movable part mounted on said adjustable rod; and a static part having a shape corresponding to that of the movable part for blocking the flow of said biomass in the form of moist material upon contact with said movable part.

14. The method according to claim 13, wherein said movable part is a cone which defines a cone slope, and said shape of the static part corresponding to that of the movable part defines a slope which is equal to, or higher than said cone slope.

15. The method according to claim 13, wherein said movable part is made of material with high erosion resistance.

16. The method according to claim 15, wherein the material with high erosion resistance is silicon carbide (SiC).

17. The method according to claim 11, wherein one or more of said one or more blowdown conduits comprise a first pipe and a second pipe which are mutually rotatable, said first pipe being provided with a close sliding fit inside said second pipe, said first and second pipe defining holes/apertures that overlap depending on the pipe being rotated for varying said adjustable open area.

\* \* \* \* \*